United States Patent Office 2,999,811
Patented Sept. 12, 1961

2,999,811
INHIBITOR COMPOSITION
James H. Schell, Houston, Tex., and Alfred Douty, Wyncote, and Harry L. Faigen, Philadelphia, Pa., assignors to Amchem Products, Inc., Ambler, Pa., a corporation of Delaware
No Drawing. Filed Aug. 7, 1957, Ser. No. 676,703
2 Claims. (Cl. 252—8.55)

This invention relates to oil and gas well operations and is especially concerned with the problem of inhibiting or minimizing metal corrosion.

The principal object of the invention is to provide an improved inhibitor formulation for protecting steel casings, tubing or other metal equipment customarily employed in both primary and secondary oil and gas recovery operations from the deleterious effects of corrosive gases and fluids encountered in such operations.

Another object of the invention is the provision of an inhibitor formulation which is essentially water or brine soluble and heavy enough to sink through the rising gases or oils coming from the well.

A still further object is to provide an inhibitor formulation which has little or no tendency to form an emulsion with the oil or gas stream in primary oil recovery operations.

Another object is to provide an inhibitor formulation which meets the foregoing requirements and at the same time, one which will not clog pores or dam off the flow of the water through an oil bearing stratum during a water-flooding operation.

How the foregoing, together with such other objects and advantages as may appear hereinafter or are incident to our invention, are attained will now be described.

The invention is based upon the discovery that an aqueous solution of from 5 to 50% of salt selected from the class consisting of sodium chloride, potassium fluoride, sodium sulfate, sodium nitrate, magnesium chloride and lithium chloride and from 5 to 50% of iron corrosion inhibitor chosen from the class of organic corrosion inhibitors which are soluble in a sodium chloride solution of at least 5% (by weight) concentration and at least enough water to render the composition consolute forms an extremely effective inhibitor formulation for the purposes previously stated. Such solutions must have a specific gravity of at least 1.0.

Various known organic inhibitors of iron corrosion may be employed and they may be linear or ring-type. The most effective of these contain nitrogen in their molecules in addition to carbon and hydrogen. Another effective group contains sulfur, or sulfur and nitrogen in addition to carbon and hydrogen. Both of these classes include many members with oxygen as part of the molecule.

Examples of iron corrosion inhibitors which are soluble as specified above, and, therefore, useful in the present invention are thioureas, soluble quaternary salts of heterocyclic coal tar bases and their soluble modifications such as are disclosed in U.S. Patent 2,403,153, aryl and alkyl amine hydrochlorides, ethylene oxide condensation products of rosin amine, water soluble salts of the substituted piperidines and pyridines, etc.

Of the foregoing corrosion inhibitors those which we prefer to employ are those which contain quaternary salts derived from heterocyclic bases, in admixture with, or reacted with soluble thioureas such as are disclosed for example in U.S. Patent 2,403,153.

Typical examples of our improved inhibitor formulations are set forth in the following formulas.

Formula I

Propargyl alcohol_____ml__ 20
Sodium chloride_____grams__ 10
Water, to make 100 ml.

Formula II o-Toluidine hydrochloride_____grams__ 15
Sodium chloride_____do____ 10
Water, to make 100 ml.

Formula III

α-Picoline hydrochloride_____grams__ 20
Sodium chloride_____do____ 10
Water, to make 100 ml.

Formula IV

Isopropyl amine hydrochloride_____grams__ 10
Sodium chloride_____do____ 5
Water, to make 100 ml.

Formula V

Methyl dodecylbenzyl trimethyl ammonium chloride_____grams__ 25
Sodium chloride_____do____ 5
Water, to make 100 ml.

Formula VI

Polyrad (4500)—A condensation product of 1 mole of rosin amine with 45 moles of ethylene oxide (manufactured by the Hercules Powder Company)_____grams__ 25
Sodium chloride_____do____ 10
Water, to make 100 grams.

In Formulas I to IV as given above we have found and wish to note the fact that any one of the salts listed in the class above set forth may be used in place of the sodium chloride called for and in the same quantity specified.

As previously indicated, preferred embodiments of the present invention are formulations which contain or are derived from heterocyclic bases and as illustrative of such a formulation, we wish to refer to the following.

Formula VII

In accordance with the general disclosure of U.S. Patent 2,403,153, 317 grams of pyridine are mixed with 200 grams of ethylene dichloride and heated on a water bath until solidification occurs. Upon solidification the solid mass is added to approximately 1000 ml. of water and the excess ethylene dichloride is removed by distillation. After removal of the excess ethylene dichloride, 150 grams of thiourea are added to the solution and the solution is heated under reflux conditions for approximately ½ hour and then cooled to room temperature. To the cooled solution there is added 100 grams of sodium chloride and sufficient water to make 1 liter. The gravity of such a product is 1.195 at 60/60 degree F.

It should be mentioned that, in preparing a composition such as just set forth under Formula VII above, quite often there will be insoluble or immiscible constituents formed. These insoluble constituents may be removed in any convenient way such as by decantation, filtration, etc.

Another preferred composition containing or derived from heterocyclic bases can be prepared in accordance with the following formula.

Formula VIII 3 moles of ammonium chloride, 15 moles of acetone, and 9 moles of aqueous formaldehyde solution (37% by weight), are mixed in a 3 liter round bottom flask equipped with a condenser. The flask is heated gently, with refluxing, for 15 hours. At the end of this time 6.0 moles of acetone are distilled off. The reaction mixture is cooled to 40° C., and a solution of 3.75 moles of sodium hydroxide in 300 ml. of water is added to the reaction mixture. This mixture is heated to boiling, with stirring, and is maintained under these conditions for 4 hours. At the end of this time the reaction mixture is poured into a separating funnel. The waste liquor separates on the bottom and is removed. The viscous upper layer is washed with hot, concentrated, sodium chloride. After washing, the black, viscous layer should weigh 555 grams and we will refer to this material as No. 1.

In a separate container 49.8 ml. of 60° Bé. sulphuric acid and 260 ml. of water are mixed and cooled to 40° C. 480 grams of No. 1 are dissolved in this acid mixture and the solution cooled at 30° C. 75 ml. of 20° Bé. hydrochloric acid is then added and the solution heated to 80° C. At this point 150 grams of thiourea is added and the solution heated to 100° C. The solution is now diluted to 2675 milliliters with water and 267½ grams of sodium chloride are dissolved therein. This temperature is maintained for 1 hour. At the end of this time the mixture is allowed to cool. This mixture is Example VIII.

While the compositions of Formulas VII and VIII above given are preferred we wish to emphasize that the materials in all of the formulas are highly effective in attaining the desired objects of the invention. Special laboratory tests of the effectiveness of these formulations have been conducted and we would like to refer particularly to the results we have been able to secure with Formulas VII and VIII. When using 100 parts per million of the composition of Formula VII in the corrosive fluid the corrosion rate expressed in mils of metal per year was measured as 0.6; and where 100 parts per million of Formula VIII were employed the metal loss in mils per year was measured as 2.1; whereas in the control operation where no inhibitor was employed the corrosion rate was measured as 6.0 mils per year.

The efficacy of the invention also was field tested in water flooding recovery practice as carried out in certain wells in the oil fields of Bradford County, Pennsylvania. Here the laboratory results as to the value of the invention were strikingly confirmed. The tests were carried out by placing exactly similar steel coupons in the water lines of a number of injection wells all of which wells were served by the same water supply and pumping system. The water flowing to all but one of these wells (referred to in the table below as the control well) was treated with a composition similar to that of Formula No. VII as given above. The inhibiting composition was added to the water over a period of weeks as indicated and at various rates and the decrease in thickness of the coupons was noted in mils/yr. Three wells and a control well were involved in one test as set forth in the following table.

TABLE I

| Number of Weeks of Inhibitor Addition to Water | Rate of Inhibitor Addition, p.p.m. | Decrease in Thickness of Coupons in mils/yr. | | | |
|---|---|---|---|---|---|
| | | Injection Well #1 | Injection Well #2 | Injection Well #3 | Control Well |
| 1 | 25 | 4.39 | 0.94 | 1.80 | 8.95 |
| 2 | 25 | 1.50 | 0.55 | 0.64 | 9.31 |
| 3 | 15 | 4.69 | 0.46 | 1.77 | 10.84 |
| 4 | 15 | 1.93 | 0.20 | 0.80 | 12.40 |
| 5 | 15 | 4.83 | 0.64 | 1.88 | 10.95 |
| 6 | 15 | 3.24 | 0.71 | 1.88 | 11.47 |
| 8 | 15 | 1.87 | 0.29 | 0.48 | 9.81 |

In a second group of wells the following results were obtained:

| Number of weeks of Inhibitor Addition to Water | Rate of Inhibitor Addition, p.p.m. | Injection Well #4 | Injection Well #5 | Control Well |
|---|---|---|---|---|
| 1 | 25 | 1.97 | 0.25 | 9.52 |
| 2 | 25 | 0.87 | 0.06 | 9.48 |
| 3 | 15 | 1.09 | 0.08 | 9.20 |
| 4 | 10 | 1.16 | 0.10 | 8.81 |

As indicated, in each of the above tests the injection wells and the corresponding control well were served by the same water supply but no inhibitor was added to that portion of the water supply which flowed to the control well. The effectiveness of our invention in combatting the corrosive effects of injection water is amply demonstrated by the above data.

In addition to its use in water flooding recovery practice, the inhibitor composition of our invention is of particular value for use in high pressure gas condensate wells. In such wells natural gas at high pressure is produced, along with entrained water and possibly liquid petroleum. In coming to a relatively low pressure from the production pressure, the gas expands and cools. As a result, liquids of a corrosive nature deposit upon the well tubing. Both gas and liquid are collected at the well head. The normal practice is to separate the liquid petroleum products from the water and vaporize them back into the gas stream. Separation of these two liquid phases is frequently rendered more difficult because previously added inhibitors cause serious emulsification of the system. This renders separation incomplete and as a consequence, the separated petroleum phase may contain a significant amount of water. When this is vaporized and fed back into the gas stream, the water, as vapor is carried into the gas. Since only a small amount of water vapor can be tolerated in natural gas, this emulsification poses a difficult problem. The product of my invention is uniquely valuable here since it provides corrosion inhibition while causing no troublesome and expensive problems of emulsification.

While my improved inhibitors have, as described, proven to be uniquely valuable in preventing corrosion in water flooding oil recovery and in gas condensate well operation, they are by no means limited in usefulness to these applications.

They may be employed advantageously in any type of "down-the-well" application. The inhibitor formulations can be added either continuously or intermittently.

We claim:
1. An inhibitor composition consisting essentially of an aqueous solution of from 5 to 50% of a salt from the group consisting of sodium chloride, potassium fluoride, sodium sulfate, sodium nitrate, magnesium chloride and lithium chloride and from 5 to 50% of an iron corrosion inhibitor from the group consisting of organic corrosion inhibitors which are soluble in a sodium chloride solution of at least 5% by weight concentration and including sufficient water to render the composition consolute.

2. An inhibitor composition according to claim 1 wherein the content of iron corrosion inhibitor is chosen from the group consisting of thioureas, soluble quaternary salts of heterocyclic coal tar bases and their soluble modifications, aryl and alkyl amine hydrochlorides, ethylene oxide condensation products of rosin amine, and water soluble salts of the substituted piperidines and pyridines.

References Cited in the file of this patent
UNITED STATES PATENTS

| | | |
|---|---|---|
| 2,472,400 | Bond et al. | June 7, 1949 |
| 2,474,603 | Viles et al. | June 28, 1949 |
| 2,738,325 | Rydell | Mar. 13, 1956 |
| 2,785,127 | Shock et al. | Mar. 12, 1957 |
| 2,802,784 | Nowak et al. | Aug. 13, 1957 |
| 2,805,722 | Morgan et al. | Sept. 10, 1957 |
| 2,814,593 | Beiswanger et al. | Nov. 26, 1957 |